(12) United States Patent
Cook

(10) Patent No.: US 7,443,452 B1
(45) Date of Patent: Oct. 28, 2008

(54) METHOD FOR SIMULTANEOUSLY DELIVERING ATSC/MPEG SOURCE MATERIAL TO DUAL MODULATED RF TELEVISION OUTPUTS

(75) Inventor: Terry D. Cook, Sioux Falls, SD (US)

(73) Assignee: Sencore, Inc., Sioux Falls, SD (US)

( * ) Notice: Subject to any disclaimer, the term of this patent is extended or adjusted under 35 U.S.C. 154(b) by 550 days.

(21) Appl. No.: 11/199,824

(22) Filed: Aug. 9, 2005

Related U.S. Application Data

(60) Provisional application No. 60/601,422, filed on Aug. 13, 2004.

(51) Int. Cl.
H04N 3/27 (2006.01)
H04N 5/46 (2006.01)
H04N 5/44 (2006.01)

(52) U.S. Cl. .................. 348/554; 348/555; 348/725
(58) Field of Classification Search ............... 348/554, 348/555, 557, 558, 725, 726, 727; 375/320, 375/345, 349, 350; H04N 3/27, 5/46, 5/44, H04N 5/455
See application file for complete search history.

(56) References Cited

U.S. PATENT DOCUMENTS 6,963,623 B2 * 11/2005 Ninomiya et al. .......... 348/725
7,250,987 B2 *  7/2007 Goyal et al. ............... 348/555

* cited by examiner

Primary Examiner—Sherrie Hsia
(74) Attorney, Agent, or Firm—Patnaude & Videbeck

(57) ABSTRACT

A single electronic device is disclosed that splits a transport stream in order to simultaneously produce NTSC and ATSC standard outputs with the same video and audio content so that the same content can be viewed side-by-side on a standard definition NTSC television and an ATSC digital HDTV set at the same time.

4 Claims, 1 Drawing Sheet

METHOD FOR SIMULTANEOUSLY DELIVERING ATSC/MPEG SOURCE MATERIAL TO DUAL MODULATED RF TELEVISION OUTPUTS

The applicant claims priority of provisional application Ser. No. 60/601,422 filed on Aug. 13, 2004 and requests that application be made a part of the file of this case.

This invention relates to providing comparability between standard analog and HDTV television sets, and more particularly, to a method of providing NTSC and ATSC outputs with the same video and audio content simultaneously to allow side-by-side viewing on standard analog and HDTV sets.

BACKGROUND OF THE INVENTION

High definition televisions are finally becoming more popular and more available in the United States. Historically, standard definition televisions received the NTSC (National Television Systems Committee) standard transmitted signals. The ATSC Advanced Television Systems Committee) standard has been adopted in the U.S. for terrestrial transmission of HDTV (High Definition Television) signals. The country is currently going through a transition period where both standards are in use.

Retail sales outlets for HDTV televisions want to show the advantages in picture and sound quality that HDTV sets offer over standard definition sets. Prior to the present invention, they have used an analog NTSC signal generator or a local television broadcast to demonstrate the standard definition sets. At the same time, they will use an HDTV player that plays recorded MPEG source material to demonstrate the HDTV sets (many areas don't have HDTV broadcasts yet, and those that do have the HDTV broadcasts only show HDTV during primetime). While this works for showing each type of set, it is difficult for consumers to make a comparison if the differing types of sets have dissimilar video content being shown. Also, during this transition period, retail sales outlets need to have multiple generators to provide signals for the different standards. It would be advantageous to have one source that could provide signals according to both standards to save on cost, space, and operational expenses.

As mentioned previously, whenever an NTSC signal has been needed for any reason—whether demonstration, signage, testing, or other reasons—either an over-the-air signal or an analog generator was used to provide the signal. It is not within the scope of this application to go into detail on how these signals are generated, since the NTSC standard has been around for a long time. But generally, an analog baseband video signal is modulated and up-converted to an RF frequency to feed into a standard NTSC TV.

ATSC signals can sometimes be received over the air, but it is much more consistent, and increasingly more common, to use an HDTV video player with an RF output to produce the ATSC signal needed for demonstration and testing purposes. These video players will generally store MPEG transport streams, serially feed a stream into an 8-VSB modulator, and up-convert it to an RF frequency for an ATSC compatible television to receive, demodulate, decode and display.

It is an object of the invention, generally stated, to produce a singular device that simultaneously produces NTSC and ATSC outputs with the same video and audio content so that the same content can be simultaneously viewed side-by-side on a standard definition NTSC television and an ATSC HDTV set.

SUMMARY OF THE INVENTION

The invention resides in a method of simultaneously delivering ATSC/MPEG source material to dual modulated RF television outlets, comprising the steps of reading and storing an MPEG transport stream, splitting the transport stream and simultaneously feeding it into an 8-VSB modulator and an MPEG decoder, converting one of the split transport streams fed into said 8-VSB modulator to an 8 level VSB signal, decoding the other of the split transport streams into baseband audio and video signals, and amplitude modulating the video signal and frequency modulating said audio signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings wherein like reference numerals identify like elements throughout and in which:

DETAILED DESCRIPTION OF THE PREFERRED EMBODIMENT

Figure 1:
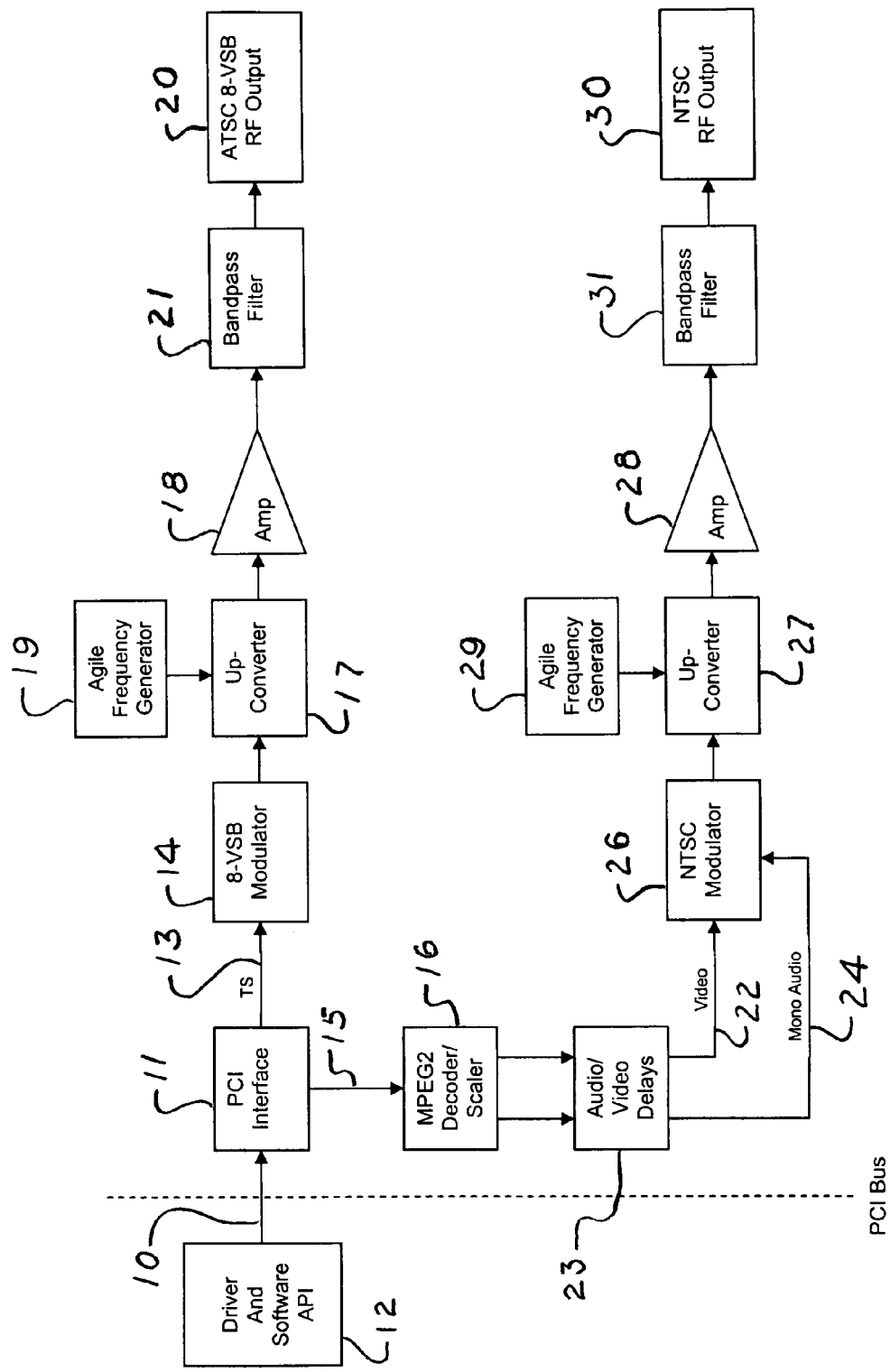
FIG. 1 is a block schematic diagram showing the present invention as found on a PCI (Peripheral Component Interconnect) card.

Referring to FIG. 1, the invention utilizes a method for generating the ATSC RF signal and the NTSC RF signal simultaneously with the same program material. In order to do this, MPEG (Moving Picture Experts Group) material 12 that is stored on some medium, such as a hard drive or DVD (Digital Versatile Disc) is read and transferred at 10 (in our product this is done via a computer PCI bus but could be done by other means) to the input of our device. From there, the MPEG transport stream (TS) is split at 11 and simultaneously fed at 13 and 15 to an 8-VSB (Vestigial Sideband) Modulator 14 and an MPEG2 Decoder 16.

The transport stream TS 13 that is fed into the 8-VSB Modulator 14 is converted into an eight level vestigial sideband signal to comply with the ATSC standard. From there, the 8-VSB signal is sent to an up-converter 17 to up-convert the signal to an RF frequency. The invention uses an agile frequency generator 19 to provide standard UHF channel frequencies from channel 14 through channel 21. However, any single channel or range of channels could be used as a variation of the invention. After up-conversion, the signal is amplified 18 and filtered 21 before being output as an ATSC 8-VSB RF signal 20 capable of being received by an ATSC compatible television or receiver.

The TS 15 that is fed into the MPEG Decoder is decoded at 16, and broken out at 23 into its baseband analog video 22 and audio signals 24, just as a receiver would do upon receiving an MPEG transport stream. The baseband analog video and audio are then fed into a common NTSC Modulator 26 that amplitude modulates the video and frequency modulates the audio to comply with the NTSC standard. Next, the modulated signal is up-converted 27 to an RF frequency. The invention uses an agile frequency generator 29 to produce standard VHF channels from 3 through 13 for the NTSC output. Again, any single channel or range of channels could be used as a variation of the invention. The NTSC RF signal is then amplified at 28 and filtered before being delivered through filter 31 to the output 30.

Since it is desired that the picture on an ATSC television be in sync with the picture on an NTSC television for viewing by a potential consumer, a small amount of signal delay is added into the MPEG Decoder 16 stage in the NTSC path. The delay is necessary because the ATSC receiver will have longer internal delays, which puts its resultant picture behind that of an NTSC picture. The delay allows the two pictures to look in sync on the two different types of receivers or televisions.

The simultaneous NTSC and ATSC RF outputs provide many benefits that relate directly to retail demonstration, digital signage, narrowcasting, theater, test and other applications. These benefits include: simultaneous viewing of NTSC and ATSC for retail demonstration; easier comparison of video quality between standards; a singular product reduces costs; a singular product reduces space; and a single product can be used currently for NTSC and for future migration to ATSC.

Thus, an improved means for providing a single source for simultaneous display of ATSC and NTSC standard video and audio signals to differing display outputs has been shown and described.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed is:

1. A method of simultaneously delivering ATSC/MPEG source material to dual modulated RF television outlets, comprising the steps of:
reading and storing an MPEG transport stream;
splitting said transport stream and simultaneously feeding same into an 8-VSB modulator and an MPEG decoder;
converting said one of said split transport stream fed into said 8-VSB modulator to an 8 level VSB signal;
decoding said other of said split transport stream into baseband audio and video signals, and
amplitude modulating said video signal and frequency modulating said audio signal.

2. The method as defined in claim 1 further including the steps of,
up-converting said 8 level VSB signal to an RF frequency, and
up-converting said modulated audio and video signals to an RF frequency.

3. The method as defined in claim 2 further including the steps of,
amplifying and filtering said up-converted 8 level VSB signal and outputting same as an ATSC 8-VSB RF signal, and
amplifying and filtering said up-converted modulated audio and video signals and outputting same as an NTSC RF signal.

4. The method as defined in claim 1 further including the step of,
adding a signal delay in an NTSC path at the MPEG decoder step equal to the amount of longer internal delays in an ATSC receiver.

* * * * *